United States Patent [19]
Magee

[11] Patent Number: 5,797,217
[45] Date of Patent: Aug. 25, 1998

[54] INSERTS PROVIDING SIZE ADAPTABLE SELF WATERING SYSTEMS FOR POTTED PLANTS

[76] Inventor: Betty Magee, 3460 Buford Hwy., Apt. L6, Atlanta, Ga. 30329

[21] Appl. No.: 609,534

[22] Filed: Mar. 1, 1996

[51] Int. Cl.$^6$ ............................................. A01G 27/00
[52] U.S. Cl. ............................................. 47/79; 47/81
[58] Field of Search ...................... 47/79, 80, 81, 47/75, 71

[56] References Cited

U.S. PATENT DOCUMENTS

| 3,783,555 | 1/1974 | Peters | 47/79 |
| 4,106,235 | 8/1978 | Smith | 47/79 X |
| 4,183,175 | 1/1980 | Magee | 47/79 |
| 5,099,609 | 3/1992 | Yamauchi | 47/79 X |
| 5,509,232 | 4/1996 | Laubsch | 47/79 |
| 5,546,700 | 8/1996 | Kumpf | 47/79 |

Primary Examiner—Michael J. Carone
Assistant Examiner—Robert Pezzuto
Attorney, Agent, or Firm—Arnall Golden & Gregory, LLP

[57] ABSTRACT

Inserts and liners are provided to form self watering systems for potted plants which optimize delivery of the water to the plants and which minimize the time and labor required to maintain the plants. The system also allows the plant to be transplanted to a larger pot without damaging the integrity of the plant or the self watering system. The system consists of an insert and a liner. In each of the preferred embodiments, an insert is provided which can be placed in a pot of any size to provide a self watering system. In the preferred embodiment, the insert is formed from a walled containing device separated into first and second compartments by a barrier extending inwardly from the perimeter of the walled containing device. The first compartment has a greater diameter than the second compartment and has orifices adjacent the barrier along its perimeter. The roots grow through the orifices into the second compartment which contains water. The system prevents leaching of the soil into the water, and water loss by evaporation.

12 Claims, 2 Drawing Sheets

INSERTS PROVIDING SIZE ADAPTABLE SELF WATERING SYSTEMS FOR POTTED PLANTS

BACKGROUND OF THE INVENTION

This invention relates in general to self-watering systems for plants, and more particularly, to inserts providing size adaptable self watering systems for potted plants.

Providing proper care to all cultivated plants requires that the care taker provide adequate water to the plants at specific time intervals. It is not healthy for plants to receive too much water which can cause roots to rot, or to receive too little water, which can cause the plants to die from lack of water. A self-watering apparatus for growing plants is disclosed in U.S. Pat. No. 4,183,175 to Magee. This apparatus includes a pot and an insert which together form a system to provide water to plants in a controlled fashion on a continuous basis. Specifically, a closed high humidity compartment is formed between the insert and the pot which only some of the roots which have grown through certain orifices can reach. The high humidity compartment is not formed if the pot is so much larger than the insert that the insert does not extend completely to the walls of the pot to close off the compartment. Therefore, the plant and insert cannot easily be transplanted to a larger pot as the plant grows since removing the roots from the orifices of the insert to transplant the plant to a larger pot may cause harm to the roots. These units are also relatively expensive to manufacture because of the complexity of the design.

It is therefore an object of the present invention to provide size adaptable self-watering systems for potted plants.

It is also an object of the present invention to provide form size adaptable self-watering systems for potted plants which are easily manufactured and readily assembled and modified.

SUMMARY OF THE INVENTION

Inserts and liners are provided to form self watering systems for potted plants which optimize delivery of the water to the plants and which minimize the time and labor required to maintain the plants. The system also allows the plant to be transplanted to a larger pot without damaging the integrity of the plant or the self watering system.

The system consists of at least an insert and a liner. In each of the preferred embodiments, an insert is provided which can be placed in a pot of any size to provide a self watering system. The insert is formed from a walled containing device separated into first and second compartments by a barrier extending inwardly from the perimeter of the walled containing device. The first compartment has a greater diameter than the second compartment and has orifices adjacent the barrier along its perimeter. The first compartment is also formed to have a shoulder adapted to form a stable and snug fit with a liner. Preferably, the shoulder extends vertically for a length sufficient to form a secure fit with the liner. In another preferred embodiment, the shoulder extends vertically for a length sufficient to hold all of the soil which the plant requires. In a preferred embodiment, the liner is a hollow containing device which at one end forms a stable and snug fit with the adapted shoulder of the first compartment. The liner is flared at the end which extends away from the shoulder.

In use, the liner is fitted with the insert to form an assembly which can be placed in a pot to form a self watering system. Specifically, soil is placed in the first compartment where the plant grows. Most of the plant's roots form in the first compartment, but some of the roots grow to extend through the orifices and into a third compartment formed by placing the liner and insert into a third container or pot. These roots become contained in the third compartment which is formed between the insert and the pot. The liner is flared to close off any space between the first compartment and the pot to form a third compartment where a high level of humidity is maintained. The third compartment communicates with the second compartment to receive water. The plant can be transplanted to a larger pot by removing the plant and the insert and replacing the liner with a liner having a greater flare so that any space between the insert and the larger pot will be closed off to maintain high humidity in the third compartment. This system avoids having to remove the roots from the orifices to transplant the plant. This system also avoids the lag time required to grow roots through the orifices when a plant is first introduced into the system.

DETAILED DESCRIPTION OF THE INVENTION

Figure 1:
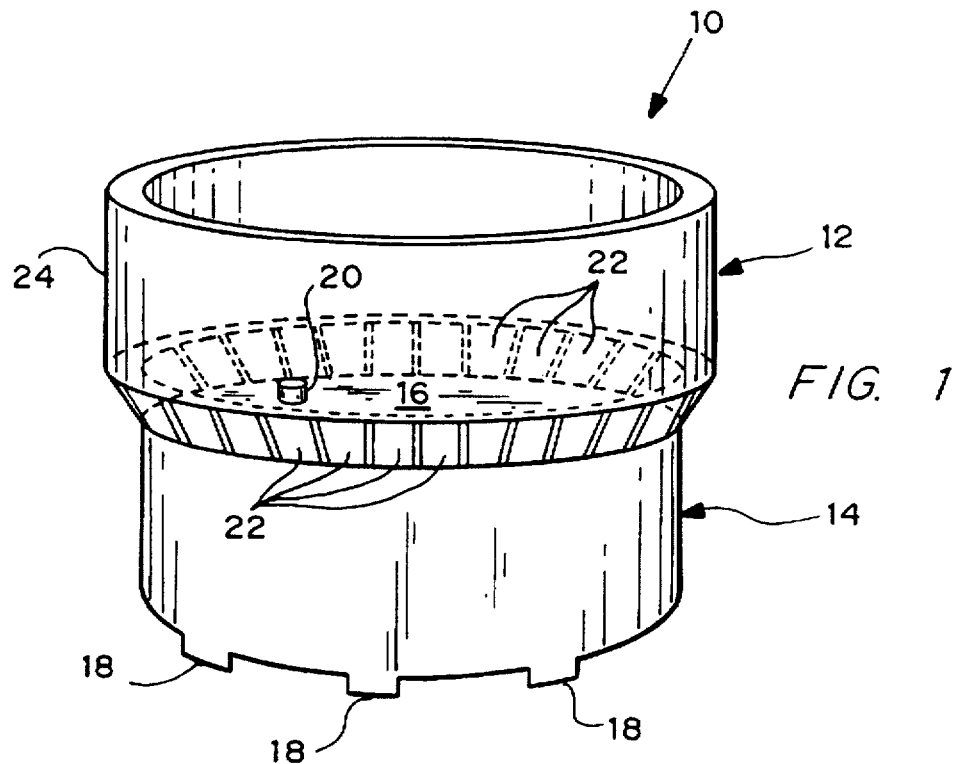
FIG. 1 shows a preferred embodiment of the insert of the present invention.

Inserts and liners are provided to form self watering systems for potted plants which allow the plant to be transplanted to a larger pot without losing the integrity of the plant or the self watering system. The advantages of a self-contained system which demonstrates superior growth and significantly decreased watering requirements are maintained.

THE COMPONENTS

Each of the components of the self watering system, the insert and the liner, can be used individually or together to form an assembly.

The Insert

The insert is formed from a walled containing device separated into first and second compartments by a barrier extending inwardly from the perimeter of the walled containing device. The plant sits in soil in the first compartment on top of the second compartment which serves as a water reservoir. The barrier is strong enough to support a plant and soil resting in the first compartment on top of the second compartment. The shape of the containing device can be cylindrical, square, rectagonal, or any other shape so long as the shape allows contents to be held securely within its compartments.

In a preferred embodiment, the first compartment has a greater diameter than the second compartment and is formed to have one or more orifices adjacent the barrier along its perimeter extending from the first compartment into the second compartment. The orifices are of a size great enough for plant roots to grow through but small enough to prevent large deposits of soil resting above the orifices to pass through. The number of orifices and their distribution are determined by the water requirements of the plant and the need for a constant moisture flux. In the preferred embodiment, multiple orifices are distributed around the perimeter of the compartment. The first compartment is also formed to have a shoulder adapted to form a stable and snug fit with a liner. Preferably, the shoulder extends vertically for a length sufficient to form a secure fit with the liner. In another preferred embodiment, the shoulder extends vertically for a length sufficient to hold all of the soil which the plant requires.

The barrier is formed to have an intlet. A tube can be inserted into this inlet so that water can be poured through the tube and deposited into the second compartment where it is absorbed by the roots of the plant extending from the first compartment into the second compartment. Although water could be added to the second compartment via the orifices at the perimeter, this could lead to leaching of soil into the second compartment and loss of nutrients from the soil, which would lead to decreased plant growth.

In another embodiment, the liner and insert are designed so that they are inserted into a pot which in combination with the barrier forms the second compartment, which may include retaining means so that the entire lower portion of the pot does not contain water. In this embodiment the barrier is merely provided with structural support rather than forming an enclosed compartment.

Preferably, the insert is formed of a sturdy lightweight material such as most thermoplastic polymers, for example, polystyrene, polycarbonate, polypropylene, typically manufactured by extrusion. Alternatively, the material could be formed from a biodegradable material such as a water-resistant cardboard or wood, having a waterproof liner inserted therein.

The Liner

The liner is a hollow containing device which at one end forms a stable and snug fit with the adapted shoulder of the first compartment. The fit can be formed from a snap fit between the liner and the shoulder. Alternatively the fit can be formed by forming the liner to have a diameter such that it snugly slides over the shoulder. Alternatively, the diameter of a portion of the liner can be more narrow than the shoulder such that a portion of the liner fits securely inside of the shoulder wherein the remaining portion of the liner rests on top of the shoulder.

The liner is flared at the end which extends away from the shoulder. Preferably the liner is manufactured in varying sizes so that the flare varies in diameter yet maintains the diameter which fits with the shoulder of the insert. The connection between the liner and the first compartment can alternatively be formed through a connector piece, such as a resilient, elastic connector or o-ring type device, which snugly connects the liner to the first compartment.

Preferably, the insert is formed of a sturdy lightweight material such as plastic.

The liner and insert are preferably inserted into another container or pot.

USING THE COMPONENTS OR THE ASSEMBLY

In a preferred method of use, one positions the insert such that the first compartment rests above the second compartment. A tube is inserted into the inlet. Soil is placed into the first compartment. The insert is then placed into a pot and the liner is fitted with the shoulder of the insert to form an assembly. The liner preferably flares at the top of the pot to form a closed third compartment between the insert and the pot. More soil and a plant is then added to the assembly. Water is deposited into the second compartment through the tube extending from the inlet. As the plant grows, the roots will extend through the orifices of the first compartment to reach the water in the closed second compartment.

It is readily apparent to those skilled in the art that the steps described herein can be performed in a different order. For example, the liner can be assembled with the insert before placing the insert into the pot.

It is also readily apparent that one can form the insert and liner without a separate second compartment, using the bottom and lower walls of the pot to form the bottom and walls of the second compartment, as long as the barrier can be sealed or snugly fit against the sides of the pot.

When a clear plastic liner is used, one can readily see when the water in the third compartment is low. Alternatively, a float such as a thin plastic pole and flag can be inserted into the tube. When the water is low, the flag will extend from the tube at a correspondingly low height.

To transplant the plant into a larger pot, one can easily remove the liner. The plant and insert are then lifted away from the pot. There is no need to risk harming the roots by removing them from the orifices which they have grown through. The plant and insert can be placed in a larger pot. A liner is then fitted onto the shoulder of the insert. The liner has a flare to correspond with the size of the pot such that a closed third compartment is formed between the insert and the new larger pot.

It is readily apparent to those skilled in the art that the insert and the liner can be used independently. If the insert is placed in a pot where the diameter of the shoulder is such that the shoulder reaches snugly against the inner periphery of the pot to form a third closed compartment, no liner is needed. Similarly, whenever it is desirable to close off the space between a plant and an outer pot used for aesthetic reasons, the liner can be used.

Specific Example 1: The Insert

An insert 10 is shown in accordance with the present invention in FIG. 1. First compartment 12 is separated from second compartment 14 by barrier 16. Second compartment 14 is formed with ridges 18 such that water deposited in second compartment 14 can communicate freely with the compartment formed by placing the insert into a pot. Barrier 16 is formed with inlet 20 such that a tube can be inserted into inlet 20 so that water can be deposited into second compartment 14. First compartment 12 is formed to have orifices 22 near barrier 16. Because the diameter of first compartment 12 is greater than the diameter of second compartment 14, roots extending through orifices 22 will extend through orifices 22 in a naturally extending downward position. Shoulder 24 is formed having a length sufficient to support a liner fitted securely with shoulder 24. Shoulder 24 can be formed to have a length sufficient to hold all of the plant's soil needs. Shoulder 24 can be modified to have a rib or indentation along its perimeter to form a snap fit with a liner.

Specific Example 2: The Liner

Figure 2:
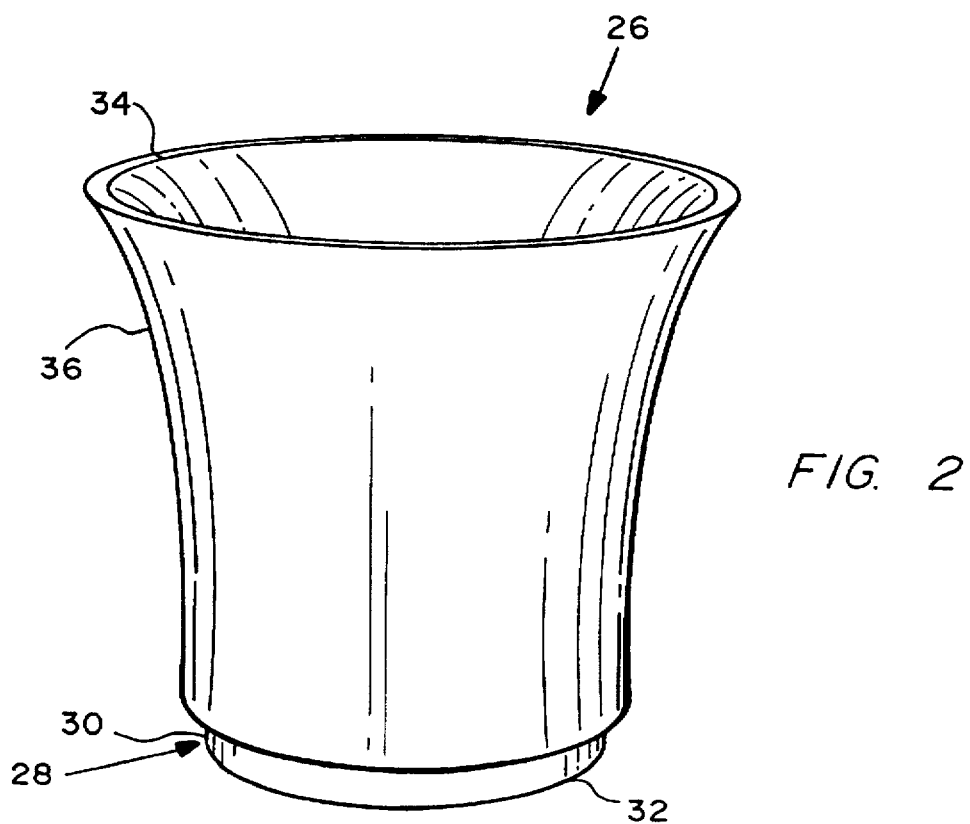
FIG. 2 shows a preferred embodiment of the liner of the present invention.

A liner 26 is shown in accordance with the present invention in FIG. 2. Liner 26 is formed with a portion 28 having a reduced diameter formed by shelf 30. Shelf 30 allows the liner 26 to be positioned securely and snugly into an insert. Alternatively, liner 26 has no shelf 30, and end 32 fits snugly over an insert. In yet another alternative embodiment, portion 28 is formed with an indentation or rib to form a snap fit with an insert. End 34 is flared such that wall 36 makes contact with the inner periphery of a pot when liner 26 is placed in a pot.

Specific Example 3: The Assembly

Figure 3:
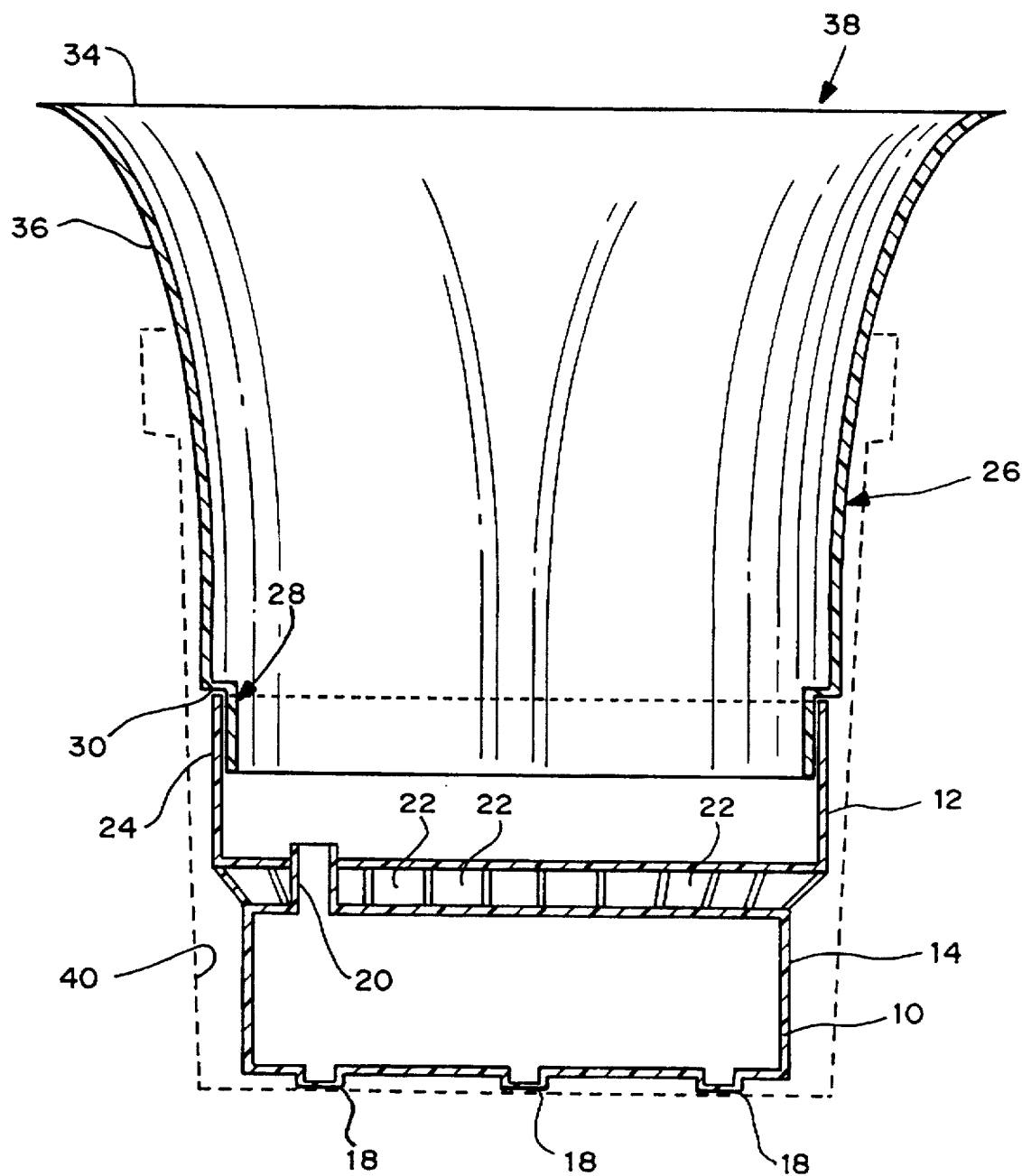
FIG. 3 shows a cross sectional view of the assembly of the insert of FIG. 1 in the liner of FIG. 2.

A cross sectional view of an assembly 38 is shown in accordance with the present invention in FIG. 3. Liner 26 is shown inserted into insert 10 at the shoulder 24. The perforated line represents a pot which the assembly 38 can be positioned within. Wall 36 comes in contact with the pot to form a third closed compartment 40 between the insert 10 and the pot. Roots which extend through orifices 22 are maintained in high humidity in closed third compartment 40. Water deposited into second compartment 14 through a tube extending from inlet 20 reaches closed third compartment 40 through canals formed by ridges 18.

Although demonstrated in the drawings as an insert placed in a pot to form a third compartment in communication with the second water containing compartment, it is readily apparent that the orifices in FIG. 1 could extend into the second compartment, which is sealed, to form a single assembly which is placed in a pot. The advantage of this assembly is that the insert and liner do not have to fit snugly against the sides of the pot in order to obtain the beneficial results achieved through the use of the sealed water compartment.

Modifications and variations will be obvious to those skilled in the art from the foregoing detailed description. Such modifications and variations are intended to come within the scope of the following claims.

I claim:

1. An insert for providing a contained watering system for potted plants comprising:

walls and a bottom forming a first compartment suitable to hold soil and a plant;

wherein the bottom of the first compartment serves as a barrier forming a sealed second compartment containing water when the insert is placed into a pot;

an inlet through which water can be introduced through the bottom of the first compartment into the second compartment; and at least one orifice communicating between the first compartment and the second compartment, wherein the orifice is sufficiently large to allow ingrowth of roots from the first compartment into the second compartment but retains soil in the first compartment, and wherein the first and second compartments form a third compartment when the insert is placed in a pot, and the second and third compartments are in liquid communication.

2. The insert of claim 1 wherein the first compartment is formed by a first section sealably connected to the barrier and a second section extending upward to hold additional soil.

3. The insert of claim 1 comprising multiple orifices extending around the periphery of the barrier.

4. The insert of claim 1 wherein the first compartment and the second compartment are formed of a single piece.

5. The insert of claim 2 wherein the walls of the first compartment form a shoulder which is sealably connected to the second section forming a liner and the top of the third compartment.

6. The insert of claim 1 further comprising a pot, wherein the insert is placed within the pot.

7. An assembly for providing a size adaptable self watering system for potted plants comprising:

an insert having a first compartment having a shoulder which is adapted to support a liner, a second compartment, and a barrier between the first and second compartments, wherein the first compartment is formed with orifices along a perimeter of the first compartment adjacent the barrier, wherein the first compartment has a diameter larger than a diameter of the second compartment, and the orifices provide for liquid communication between the first and second compartments; and a liner assembled to have a secure fit with the shoulder of the insert wherein the liner is flared at an end extending away from the insert and forms a third compartment in liquid communication with the second compartment when the insert and liner are placed in a pot.

8. The assembly of claim 7 wherein the barrier comprises an inlet for addition of liquid into the second compartment.

9. The assembly of claim 7 wherein the second compartment has at least one orifice adjacent the bottom portion of the first compartment allowing ingrowth of roots from the first compartment into the second compartment.

10. The assembly of claim 7 wherein the shoulder extends substantially perpendicular to the barrier.

11. The assembly of claim 7 wherein the shoulder extends for a length sufficient to hold enough soil required for a plant to grow in the first compartment.

12. The assembly of claim 7 wherein the insert is of a size which fits into a pot used for plants, and the flare of the liner is of a size which closes off an area between the insert and an inner periphery of the pot.

* * * * *